United States Patent [19]
Rivere

[11] 3,989,015
[45] Nov. 2, 1976

[54] DISTRIBUTION APPARATUS FOR AN INTERNAL COMBUSTION ENGINE WITH STRATIFIED CHARGE

[75] Inventor: Jean-Pierre Rivere, Paris, France

[73] Assignee: Regie Nationale des Usines Renault, Boulogne-Billancourt, France

[22] Filed: Mar. 11, 1975

[21] Appl. No.: 557,381

[30] Foreign Application Priority Data
Mar. 12, 1974 France .............................. 74.08352

[52] U.S. Cl. .................... 123/75 B; 123/32 ST; 123/32 SP; 123/188 B; 123/191 S
[51] Int. Cl.² ........................................ F02B 19/10
[58] Field of Search ......... 123/32 SP, 32 ST, 188 B, 123/191 S, 75 B; 251/251, 262, 263

[56] References Cited
UNITED STATES PATENTS

| | | |
|---|---|---|
| 914,864 | 3/1909 | McMyers ...................... 123/188 R |
| 2,164,522 | 7/1939 | Howard ........................... 123/188 B |
| 2,758,576 | 8/1956 | Schlamann ...................... 123/32 SP |
| 3,830,205 | 8/1974 | Date et al ...................... 123/32 ST |

Primary Examiner—Wendell E. Burns
Assistant Examiner—David D. Reynolds
Attorney, Agent, or Firm—Haseltine, Lake & Waters

[57] ABSTRACT

A prechamber in the cylinder head of an internal combustion engine is fed with a rich air-fuel mixture by means of a valve comprising a flexible blade element which normally rests on a flat seat. The actuator control for opening of the blade element is effected on the one hand by natural aspiration of the cylinder and on the other hand by a cam element carried by a cam shaft and directly acting on the flexible blade element.

9 Claims, 6 Drawing Figures

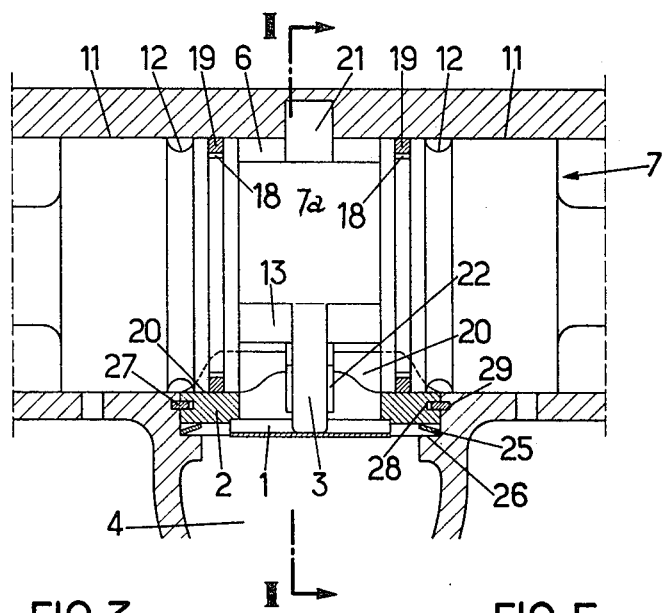
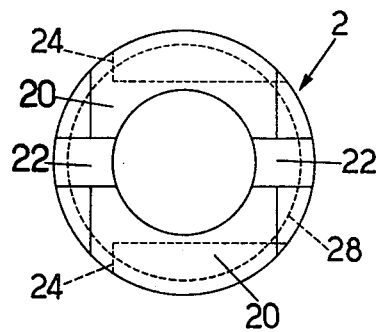
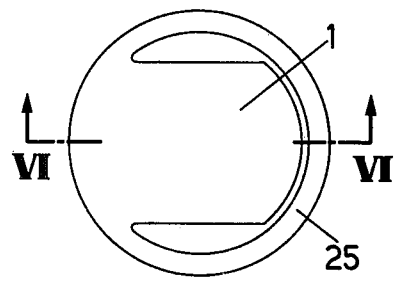
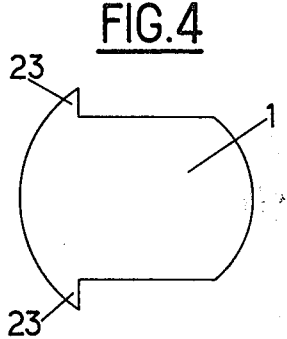

DISTRIBUTION APPARATUS FOR AN INTERNAL COMBUSTION ENGINE WITH STRATIFIED CHARGE

BACKGROUND

The present invention relates to the feeding of air-fuel mixtures to internal combustion engines and, more particularly, the feeding of pre-chambers of engines of the type having a stratified charge and a prechamber.

The latter type has been developed in order to reduce atmospheric pollution of internal combustion engines. In fact, the prechamber can be fed with a "rich" mixture and the conventional combustion chamber with a very "lean" mixture of air and fuel. The ignition of the mixture referred to as rich in the prechamber is achieved with conventional means, namely: a spark plug, a coil, or a cam-controlled interrupter in an igniter-distributor. One or a plurality of communication holes between the main chamber and the prechamber permit the flame front created in the latter to assure the combustion of the mixture referred to as lean in the main chamber.

However, the feed of air to the prechamber is actually realized with conventional means which is very complex namely:
 a poppet valve (necessitating a seat generally at the top of the prechamber),
 a valve guide,
 a control rocker for the valve, and
 a control cam for the rocker.
In all, it is necessary to provide for each combustion chamber:
 three valves,
 three rockers, and
 three cams.
The feed apparatus is therefore very cumbersome and poses serious problems of mounting in the cylinder head and especially in heads already produced for internal combustion engines of the type not provided with a prechamber.

SUMMARY OF THE INVENTION

An object of the present invention is to provide an embodiment for the feed of the prechamber whose construction is simplified and the complexity of which is reduced to a strict minimum while its operation is facilitated to the maximum.

The invention consists of feeding the prechamber with a rich fuel mixture by means of a flexible blade valve construction comprising a flexible blade element which normally rests on a flat seat, the control for opening of the blade being effected on the one hand by the natural aspiration of the cylinder and on the other hand by a cam element carried by a cam shaft and directly acting on the flexible blade; the rich fuel mixture is preferably accumulated at the circumference of the cam shaft and distributed by passing on the two faces of the cam, the circumference of the cam shaft corresponding to this passage being protected against the infiltration of oil coming from the bearings of the cam shaft by evacuation grooves under pressure and sealing joints.

Other features of the invention will become apparent from the following description of one embodiment given by way of example and illustrated in the attached drawing.

BRIEF DESCRIPTION OF THE DRAWING

FIG. 2 is a section taken along line 2—2 in FIG. 1,
FIG. 3 is a top plan view of the valve seat,
FIG. 4 is a top plan view of the flexible blade adapted to be fixed under the aforesaid seat to constitute a valve,
FIG. 5 is a top plan view of a modification of the flexible blade in the form of a ring spring,
and
FIG. 6 is a section taken along line 6—6 in FIG. 5.

DETAILED DESCRIPTION

Figure 1:
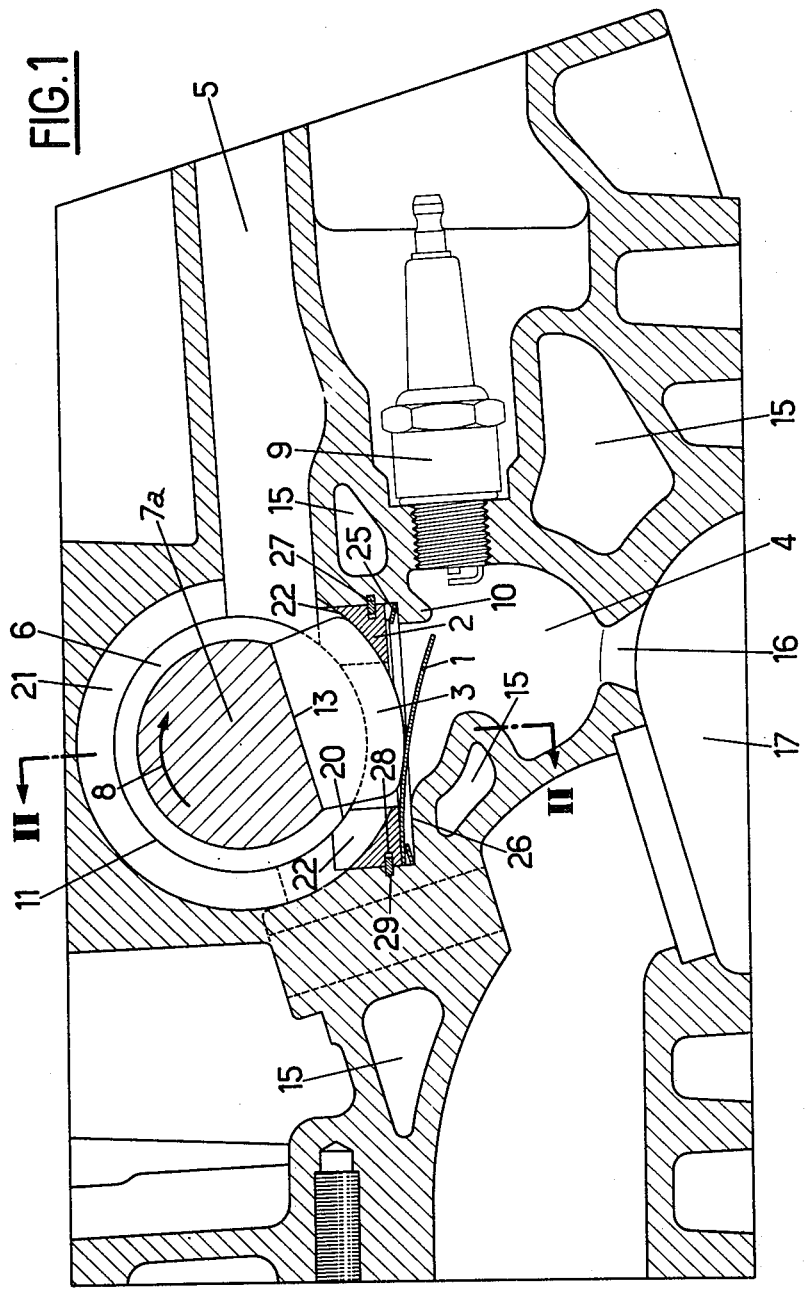
FIG. 1 is a section through the cylinder head taken along line 1—1 in FIG. 2.

As seen in the drawing and according to the invention, the distribution of the rich mixture into the prechamber is effected in the following manner.

The ordinary poppet valve has been replaced by a valve having a flexible blade 1 of a type known in itself and an embodiment of which is shown in FIGS. 1–4.

The flexible blade 1 rests on a seat 2, an embodiment of which is shown in FIGS. 1–3. The respective flat surfaces of the blade and of the seat provide the necessary sealing when the blade 1 is in closed position against the seat.

The control for opening of the blade 1 is effected on the one hand by the natural aspiration of the cylinder during the admission stroke and on the other hand by a cam element 3 projecting from a flat surface 13 cut on the cylindrical surface of a smaller diameter portion 7a of a cam shaft 7. As the cam shaft 7 rotates, the cam element 3 periodically contacts blade 1 to push the same away from seat 2 and when the cam element leaves the blade 1, the blade resiliently returns to seal against seat 2. The air-fuel mixture is fed from a carburetor or the like via conduit 5 and the air-fuel mixture is introduced into a groove 6 formed between the outer surface of portion 7a and the inner surface of the bore in the cylinder head receiving the cam shaft 7. The groove 6 serves as a throat for circulation of the gas as shown in FIGS. 1 and 2. The groove 6 is unsymmetrical due to the formation of flat surface 13.

It is to be appreciated that the throat 6 for establishing communication between conduit 5 and the prechamber 4 is formed by machining the circumference of the cam shaft to form portion 7a. This arrangement is all the more advantageous since the fuel accumulated in the cavity 6 around the cam shaft, outside the admission stroke, is disposed for a time equal to about three-quarters of a rotation of the cam shaft and can vaporize and thus improve the preparation of the fuel mixture.

It is noted that the disposition thus adopted provides the following additional advantages:

The direction of rotation of the cam shaft indicated by arrow 8, permits at the unsymmetrical throat 6 effectuation of a scavenging movement to accelerate the speed of the air admitted at the end of the closure of said throat 6.

The direction of opening of the blade 1 controls the direction of feed of the fuel mixture towards the spark plug 9. However, in order to avoid flooding of the spark plug, a lip or edge 10 prevents the liquid fuel from wetting the spark plug 9 for protection of the spark plug electrodes against fouling by fuel deposits.

The totality of the two arrangements cited hereinabove diminishes non-uniformity in the air-fuel mixture in the prechamber and consequently reduces the emission of unburned hydrocarbons in the exhaust gas.

According to another characteristic feature of the invention, in order to lubricate the bearings of the cam shaft it is necessary to admit oil under pressure to the circumferences of bearings 11 of the cam shaft. It is necessary to avoid all communication between the oil circuit and the admission conduit 5 and throat 6 in order that the fuel does not mix with the oil on the one hand, and that the oil does not flow away into the admission circuit 5 and throat 6 on the other hand. There is provided for this purpose, two grooves 12 machined in the circumference of the cam shaft preventing the oil under pressure injected on the surfaces of the bearings 11 to normally flow under atmospheric pressure into the engine, said grooves 12 thereby preventing the oil from flowing towards the admission conduit 5 and throat 6. An evacuation hole for the oil is machined in the lower part of the cylinder head under the bearings of the cam shaft in order to permit the discharge of this oil towards the lower crank case of the engine.

The isolation of the grooves 12 from the admission circuit constituted by the conduit 5 and the throat 6 can be effected by sealing joints having lips of the same type as those which are mounted on the supports of the crank shaft. However, as shown in FIG. 2, the sealing can also be obtained by means of metallic rings 19 which are received in grooves 18 machined in the circumference of the bearings 11 of the cam shaft. The mounting is conceived such that each ring 19 is squeezably mounted in the cam shaft and is free with minimum lateral play in the corresponding rotational surface of the bore for the cam shaft. This arrangement has the advantage of obtaining one-piece cam shafts with integral bearings whereas the utilization of sealing joints with lips would require the use of bearings in two parts as in the case of mounting of the drive shaft.

In order to avoid an excessive spacing between the two rings 19 defining the non-lubricated portion of the cam shaft, an exterior groove for the ring 19 can be formed in part in the bore in the cylinder head and in part in the cylindrical portions of the circumferential surface 20 at the upper part of the seat 2.

In order to form the passage for that portion of the cam element 3 projecting beyond the cylindrical bore in the cylinder head is provided, around the cam element 3 with a circular groove 21 aligned with two countersunk portions 22 formed in the top of the seat 2.

The blade 1 comprises two lugs 23 each embedded in a groove 24 in the seat 2 of the same thickness and the same shape. The lugs are each held in its associated groove by means of a spring washer 25 of Belleville type placed at the bottom of a recessed housing 26 in the head for the valve seat.

The seat 2 of the valve is engaged in housing 26 and is maintained therein against the spring 25 by a sealing collar 27 which extends in part in circular grooves 28 and 29 respectively formed in the seat 2 and the cylinder head. The lateral play of the collar 27 in the grooves 28,29 is much lower than the play of the mounting of the seat against the lateral sealing surfaces of rings 18 in the bearings of the cam shaft avoiding the transmission thereto of the pressure of the gas at the time of explosion in the combustion chamber, this being resisted by the collar 27 operating in shear.

According to this arrangement, the valve seat advantageously constituted of porous bronze frit is not demountable. It is of one piece construction of relatively low cost and it is destroyed if change of the valve is necessary. An impact force delivered on the seat through the passage hole of the prechamber, with the head demounted, produces a rupture of the collar 27 and removal of the seat from its housing. The collar 27 is then withdrawn as a circlip. There can then be replaced a new assembly of seat, valve and collar. There is chosen for the valve seat, by reason of shape and strength, an alloy frit permitting rupture of collar 27 by impact for the demounting and sufficiently resistent to resist the gas pressure of the explosion which is less intense and is distributed.

As a variant, the blade 1 can advantageously be stamped and pressed in a single piece with an integral spring washer 25 as shown in the embodiment of FIGS. 5 and 6 thus insuring economically the multiple functions of each piece and rendering unnecessary the lugs 23 and groove 24 in the bottom of seat 2 to assure its being maintained in position, the bottom of the seat 2 thus being absolutely flat.

It is noted that the disposition of the rotatable distributor in this invention avoids direct communication between the admission conduits 5 and the exhaust, as in the case of engines having a single distributor for rotatable distribution. Consequently, they present no danger of pollution from unburned hydrocarbons by direct transfer from the fuel, which is present, in general, in engines having a single rotatable distributor.

Finally, the blade 1 thermally isolates the combustion chamber from the cam shaft and it therefore poses none of the problems of cooling thereof as in conventional engines with rotatable distribution. The valve itself which is subjected to a time of heating which is less than the periods of cooling during admission is less thermally heated. At ignition, the pressure and temperature can make the blade 1 take an instantaneous concave form whose central peak comes to bear on the surface of the cam shaft, the mass of which thus provides a cooling effect by contact on this central part which is the most heated part of the valve. The free end of the blade bears against the seat at the time of explosion to resist the pressure of the explosion.

This arrangement permits the utilization of a relatively thin valve whose flexure affords little resistance which diminishes friction and increases the yield at the time of its engagement by the cam.

This cam can advantageously be separately mounted on the cam shaft and formed from a metal having a low coefficient of friction and high conductivity, such as bronze, optionally porous and fixed on the cam shaft.

Cooling of the prechamber can be effected by a circulation of water in cavities 15. An aperture 16 in the cylinder head provides communication between the prechamber 4 and the combustion chamber 17 so that the main charge of lean fuel mixture in the combustion chamber will be ignited.

In addition to the admission of the airfuel mixture to the prechamber by elastic valve means of the type disclosed above, the main admission to the combustion chamber can be also realized by means of elastic valves of this same type whereas the exhaust of the combustion chamber is controlled by conventional poppet valves.

Numerous variations and modifications of the disclosed embodiment will become apparent to those skilled in the art without departing from the scope and spirit of the invention as defined in the appended claims.

What is claimed is:

1. In an internal combustion engine having a main combustion chamber and a prechamber formed in a cylinder head provided with conduit means for supplying air-fuel mixture to the prechamber, the improvement comprising valve means for controlling admission of air-fuel mixture into the prechamber, a rotatable cam shaft, and a rotatable actuator mounted on said cam shaft for rotation therewith to operate the valve means, said valve means including a flat blade element, and a seat member for said flat blade element, the flat blade element being resilient and urged by its resilience into a closed position against said seat member, said rotatable actuator comprising a cam on said cam shaft shaped to periodically contact and open the blade element to feed the air-fuel mixture to the prechamber, said blade being also subjected to suction in the prechamber during the admission stroke of the engine tending to move the blade to open position, said cam shaft including a pair of spaced bearing portions adapted for rotation in a bore provided in the cylinder head of the engine, said cam being disposed between bearing portions and being of reduced size to define with the cylinder head an unsymmetrical channel which communicates with the conduit means supplying the air-fuel mixture.

2. The improvement as claimed in claim 1. wherein the engine has a spark plug in said prechamber, said flat blade element having an opened position in which it is oriented to direct the air-fuel mixture towards said spark plug.

3. The improvement claimed in claim 1 wherein said cam includes a cylindrical portion with a truncated flat surface and a cam element centrally projecting from said flat surface.

4. The improvement claimed in claim 3 wherein said cam shaft rotates in a given direction to produce a scavenging action on the air-fuel mixture in said channel during the admission stroke.

5. The improvement claimed in claim 3 wherein said bearing portions are lubricated and are provided with intercepting grooves for preventing lubricant from entering the prechamber, and sealing joints downstream of said grooves for forming a seal between said bearing portions and the cylinder head and seat member.

6. The improvement as claimed in claim 5 wherein said cylinder head and said seat member are provided with aligned grooves in which said sealing joints are cooperatively received.

7. The improvement as claimed in claim 3 wherein said cam element projects beyond the periphery of the cam shaft, said seat member and said cylinder head being provided with a circular groove to provide passage of said cam element.

8. The improvement as claimed in claim 1 wherein said cylinder head has a recess receiving said seat member, said cylinder head and seat member having aligned grooves, an elastic sealing collar extending into said grooves to seal the seat member in said recess, and a resilient element in said recess beneath said seat member for action on said blade element to hold the same against the seat member and maintain the assembly thereof in said recess.

9. The improvement as claimed in claim 8 wherein said resilient element is a spring washer integrally formed with said blade element.

* * * * *